Patented Jan. 22, 1929.

1,700,103

UNITED STATES PATENT OFFICE.

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS.

PROCESS OF CONDENSATION OF MIXED ALDEHYDES.

No Drawing.   Application filed February 27, 1926.   Serial No. 91,249.

My invention relates to a process of condensation of mixed aldehydes in such manner as to produce a mixed ester.

The condensation of acetaldehyde $$(CH_3CHO)$$

into ethyl acetate ($CH_3COO\ C_2H_5$) has been described. The condensation of the corresponding butyraldehyde ($C_3H_7CHO$) into butyl butyrate ($C_3H_7COOC_4H_9$) has also been described.

In view of the present large demand for esters for use as solvents for pyroxylin lacquers, it may seem surprising, on first thought, that these processes have not been utilized on a large scale. The difficulties are probably these:

Ethyl acetate is low in price because it may be made very cheaply from alcohol and acetic acid, while butyl butyrate has not a satisfactory odor or a suitable rate of evaporation for use in all pyroxylin compositions.

I have now discovered means of condensing two aldehydes to give a mixed ester, that is, an ester containing a different number of carbon atoms in the alkyl and in the acid radical. Thus butyl acetate $$(CH_3COOC_4H_9),$$

containing 4 carbon atoms in the alkyl group and only 2 in the acid radical, may be made by my process.

I utilize a mixture comprising two aldehydes with the number of carbon atoms in their molecules the same that it is desired to have in the respective acid and alkyl radicals of the finished ester. Thus, to make butyl acetate, I use acetaldehyde and butyraldehyde, together with a suitable catalyst.

The catalyst is preferably an aluminum alkyl oxide. A good one is aluminum butoxide, $(C_4H_9O)_3Al$. I may add to the catalyst a promoter such as substantially anhydrous zinc chloride. Also I may add a solvent, such as ethyl acetate or xylol, to bring the catalyst and its promoter into solution previous to blending with the mixed aldehydes.

Under the influence of catalytic action, the two aldehydes react rapidly to give butyl acetate or other esters, according to this typical equation:

$$CH_3CHO + C_3H_7CHO = CH_3COOC_4H_9$$

A difficulty arises in the formation of various undesirable esters. Thus aldehyde and butyraldehyde may give and do give ethyl acetate, butyl acetate, ethyl butyrate, and butyl butyrate unless a special process is employed.

To avoid the formation of large quantities of the malodorous butyrates my process is especially adapted.

I have discovered that the equilibrium may be so shifted as to give chiefly acetate esters by the use of a large excess of acetaldehyde over the butyraldehyde. Instead of using a molecular proportion of acetaldehyde to one of butyraldehyde and obtaining large amounts of both acetates and butyrates, I may use an increased proportion of acetaldehyde to butyraldehyde and thus obtain a decreased yield of the butyrates.

A specific example of the application of my process follows. For comparison, there is given data for an excess of acetaldehyde and also for the condensation of the two aldehydes when used in equi-molecular proportions.

The two aldehydes were mixed and cooled in an ice-bath. A xylene solution of a portion of the catalyst and promotor was then added. When the reaction had begun, the remainder of the catalyst, in solid ground form, was introduced. Then the whole mixture was stirred for a few hours, while cooled in an ice-bath, and allowed to stand overnight.

The tablulated results show clearly the formation of mixed esters and a decrease in the amount of undesirable butyrate when the excess of acetaldehyde is used.

| | | |
|---|---|---|
| Butyraldehyde, g | 100 | 100 |
| Acetaldehyde, g | 61 | 183 |
| Xylene, g | 16 | 16 |
| Aluminum butyl oxide, g | 16 | 16 |
| Zinc chloride, anhydrous, g | 0.3 | 0.3 |
| Excess of acetaldehyde over butaldehyde, per cent | 0 | 200 |
| Products of the condensation: | | |
| Ethyl acetate, g | 37 | 125 |
| Butyl acetate, g | 90 | 133 |
| Butyl butyrate, g | 27 | 7 |

In addition to these products, there were several small fractions, one of which contains ethyl butrate.

The decrease, due to use of excess of acetaldehyde, in the amount of butyl butyrate, the ill-smelling fraction, from 27 to 7 g. is especially important.

While I have illustrated the method of use of my process which should prove most profitable at present prices for the various esters, I may change the proportion of the lower and higher aldehydes to make a different ester predominate in the product to suit other market conditions. Thus, if ethyl butyrate should, by chance, come into demand at attractive prices, I may use an excess of butyraldehyde over acetaldehyde. In fact, in selecting the proportions of any chosen aldehyde to a lower homolog, there may be used an excess of the one which contains the number of carbon atoms desired in the acid radical of the ester made by the condensation.

I may substitute other catalysts, such as other aluminum alkyl oxides or alkyl oxides of other metals. I may use other promoters than zinc chloride to accelerate the action of the catalyst. I may vary many conditions without departing from my invention.

I may use other solvents for the catalyst and promoter, such for example, as ethyl acetate.

I claim:—

1. The process of manufacturing butyl acetate which comprises the condensation of butyraldehyde with acetaldehyde in the presence of aluminum butoxide and a promoter.

2. The condensation, in the presence of an aluminum alkyl oxide, of an aliphatic aldehyde with another aliphatic aldehyde, the aldehyde being used in excess of equi-molecular proportions which contains the number of carbon atoms desired in the acyl radical of the ester.

3. The condensation, in the presence of aluminum butoxide, of an aliphatic aldehyde with another aliphatic aldehyde, the aldehyde being used in excess of equi-molecular proportions which contains the number of carbon atoms desired in the acyl radical of the ester.

4. The condensation, in the presence of an aluminum alkyl oxide, and a promoter, of an aliphatic aldehyde with another aliphatic aldehyde, the aldehyde being used in excess of equi-molecular proportions which contains the number of carbon atoms desired in the acyl radical of the ester.

5. The condensation, in the presence of an aluminum alkyl oxide and zinc chloride, of an aliphatic aldehyde with another aliphatic aldehyde, the aldehyde being used in excess of equi-molecular proportions which contains the number of carbon atoms desired in the acyl radical of the ester.

6. The condensation, in the presence of aluminum butoxide and zinc chloride, of an aliphatic aldehyde with another aliphatic aldehyde, the aldehyde being used in excess of equi-molecular proportions which contains the number of carbon atoms desired in the acyl radical of the ester.

7. The process of manufacturing butyl acetate which comprises the step of condensing butyraldehyde with acetaldehyde, the latter being in excess of the equi-molecular proportion, in the presence of an aluminum alkyl oxide.

8. The process of manufacturing butyl acetate which comprises the step of condensing butyraldehyde with acetaldehyde, the latter being in excess of the equi-molecular proportion, in the presence of aluminum butoxide and zinc chloride.

9. The process of manufacturing butyl acetate which comprises the treatment of 100 parts by weight of butyraldehyde with 183 parts of acetaldehyde, 16 parts aluminum butoxide, 0.3 of one part of zinc chloride, and 16 parts xylol, the mixture being cooled by cold water.

In testimony, that I claim the foregoing as my own, I have hereto affixed my signature.

ROBERT H. VAN SCHAACK, Jr.